US011520645B2

(12) United States Patent
Recker et al.

(10) Patent No.: US 11,520,645 B2
(45) Date of Patent: Dec. 6, 2022

(54) APPARATUS AND METHOD FOR STRUCTURING A RESOURCE OF AN APPLICATION PROGRAMMING INTERFACE

(71) Applicant: ViaSat, Inc., Carlsbad, CA (US)

(72) Inventors: Cynthia L Recker, Mesa, AZ (US); Roger M Prenger, Gilbert, AZ (US)

(73) Assignee: VIASAT, INC., Carlsbad, CA (US)

( * ) Notice: Subject to any disclaimer, the term of this patent is extended or adjusted under 35 U.S.C. 154(b) by 0 days.

(21) Appl. No.: 17/265,514

(22) PCT Filed: May 13, 2019

(86) PCT No.: PCT/US2019/032039
§ 371 (c)(1),
(2) Date: Feb. 2, 2021

(87) PCT Pub. No.: WO2020/027896
PCT Pub. Date: Feb. 6, 2020

(65) Prior Publication Data
US 2021/0294678 A1   Sep. 23, 2021

Related U.S. Application Data

(60) Provisional application No. 62/714,266, filed on Aug. 3, 2018.

(51) Int. Cl.
*G06F 7/06*   (2006.01)
*G06F 9/54*   (2006.01)
(52) U.S. Cl.
CPC .............. *G06F 9/547* (2013.01); *G06F 9/546* (2013.01)

(58) Field of Classification Search
CPC ................................. G06F 9/547; G06F 9/546
See application file for complete search history.

(56) References Cited

U.S. PATENT DOCUMENTS

2003/0145036 A1\*   7/2003   Hartmann ............ G06K 7/0008
707/E17.112
2004/0237090 A1\*   11/2004   Pfeifer .................... G06F 9/465
719/310

(Continued)

OTHER PUBLICATIONS

Li Li et al. ("Designing Large Scale REST APIs Based on REST Chart", 2015) . (Year: 2015).\*

(Continued)

*Primary Examiner* — Andy Ho
*Assistant Examiner* — Abdou K Seye
(74) *Attorney, Agent, or Firm* — Chang & Hale LLP (57) ABSTRACT

A system and method of the disclosure relates to structuring at least one resource of an application programming interface (API) for a server. In the method, a plurality of field-level elements may be defined. Each of the plurality of field-level elements may be associated with a respective property. Also, first and second message-level elements may be defined. The first message-level element may be based on a first field-level element of the plurality of field-level elements, and the second message-level element may be based on the first field-level element. The API may be associated with a first resource having properties resolved based on at least the first and second message-level elements.

35 Claims, 5 Drawing Sheets

(56) References Cited

U.S. PATENT DOCUMENTS

| | | | | |
|---|---|---|---|---|
| 2009/0164490 | A1* | 6/2009 | Wininger | G06Q 10/06 715/705 |
| 2010/0167723 | A1* | 7/2010 | Soumier | H04B 7/18506 455/431 |
| 2016/0070605 | A1* | 3/2016 | Moore | H04L 67/42 719/316 |
| 2018/0089005 | A1 | 3/2018 | Green | |

OTHER PUBLICATIONS

Salvadori Ivan, et al: "A Maturity Model for Semantic RESTful Web APIs", XP033195704, 2015 IEEE International Conference on Web Services, Jun. 27, 2015, IEEE, https://dx.doi.org/10.1109/ICWS.2015.98, Jun. 27, 2015, pp. 703-710.

International Search Report and Written Opinion issued in international application No. PCT/2019/032039 dated Sep. 7, 2019 in 10 pages.

* cited by examiner

```
Curl -X POST "https//<server>/<pathname>/acct/start"
-H "accept: application/json"
-H "Content-Type: application/json" -d
{
  \"endpoint\" : \"acct/start\",
  \"data\" : {
    \"common\" : {
        \"vessel_id\" : \"N100XXA\",
        \"event_time\" : \"2018-02-13T19:08:46.503Z\",
        \"flight_id\" : \"N100XXA_SF_150122132435\"
    }
    \"acct_session_id\" : \"123e4567-e89b-12d3-a45\",
    \"device_mac\" : \"02a2b3c4d5e6f\",
    \"auth\" : {
      \"type\" : \"user\",
      \"uid\" : \"joe_user@awesome.com\"
    },
    \"wanIpAddress\" : \"08.37.96.40\",
    \"activeModemMacAddress\": \"00:A0:BC:DE:96:34\",
    \"service_id\" : 71,
    \"category\" : \"PED\"
  }
}
```

FIG. 7

| Message Collection | Object (Int.) Collection | Field Collection |
|---|---|---|
|  |  | endpoint |
| acct/start | common | vessel_id |
|  |  | event_time |
|  |  | flight_id |
|  |  | account_session_id |
|  | auth | type |
|  |  | uid |
|  |  | wanIpAddress |
|  |  | activeModemMacAddress |
|  |  | service_id |
|  |  | category |

FIG. 8

```
Curl -X POST "https//<server>/<pathname>/user/agent"
-H "accept: application/json"
-H "Content-Type: application/json" -d
{
  \"endpoint\" : \"user/agent\",
  \"data\" : {
    \"common\" : {
      \"vessel_id\" : \"N100XXA\",
      \"event_time\" : \"2018-02-14T17:18:43.073Z\",
      \"flight_id\" : \"N100XXA_LA_150123287439\"
    }
    \"user_agent\" : \"Mozilla/5.0\",
  }
}
```

FIG. 9

| Message Collection | Object (Int.) Collection | Field Collection |
|---|---|---|
|  |  | endpoint |
| user/agent | common | vessel_id |
|  |  | event_time |
|  |  | flight_id |
|  |  | user_agent |

FIG. 10

APPARATUS AND METHOD FOR STRUCTURING A RESOURCE OF AN APPLICATION PROGRAMMING INTERFACE

CROSS-REFERENCE TO RELATED APPLICATION

This application claims the benefit of U.S. Provisional Application No. 62/714,266, filed Aug. 3, 2018, which application is incorporated herein by reference.

BACKGROUND

Field

The present disclosure relates generally to structuring at least one resource of an application programming interface for a server using reusable hierarchical data components.

Background

An Application Programming Interface (API) provides a connection between distributed computer programs. API's have become popular for allowing a client computer to access information from a server computer over the internet using the http protocol. The popularity and value of an API is impacted by its accompanying documentation and ease-of-use. Accordingly, tools have been developed to assist in defining and documenting and API. Examples are Swagger-Hub, RAML, and Apiary. However, defining and maintaining an API continues to be a relatively tedious and time consuming process. Further, implementing changes to an API, even during the definition process, requires significant effort.

SUMMARY

An aspect of the present disclosure may reside in a method for structuring at least one resource of an application programming interface (API) for a server. In the method, a plurality of field-level elements may be defined. Each of the plurality of field-level elements may be associated with a respective property. Also, first and second message-level elements may be defined. The first message-level element may be based on a first field-level element of the plurality of field-level elements, and the second message-level element may be based on the first field-level element. The API may be associated with a first resource having properties resolved based on at least the first and second message-level elements.

In more detailed aspects of the disclosure, the first message-level element is further based on a second field-level element, and the second message-level element is further based on a third field-level element. Also, at least one intermediate-level element may be defined, wherein each intermediate-level element may be based on at least one field-level element, and the first message-level element may be based on a first intermediate-level element.

In other more detailed aspects of the disclosure, the second message-level element may be based on the first intermediate-level element. The first intermediate-level element may be based on the first field-level element and a fourth field-level element. Each intermediate-level element may differ from another intermediate-level element by at least one field-level element. The first message-level element may be further based on a second intermediate-level element. The second intermediate-level element may be based on a fifth field-level element and a sixth field-level element. The first resource may comprise an endpoint, and each property associated with a field-level element may comprise a name-value pair.

Another aspect of the disclosure may reside in an apparatus for structuring at least one resource of a web application programming interface (API) for a server, comprising: means for defining a plurality of field-level elements, wherein each of the plurality of field-level elements may be associated with a respective property; and means for defining first and second message-level elements, wherein the first message-level element may be based on a first field-level element of the plurality of field-level elements, and the second message-level element may be based on the first field-level element. The API may be associated with a first resource having properties resolved based on at least the first and second message-level elements.

Another aspect of the disclosure may reside in a non-transitory computer-readable medium, comprising: code for causing a computer to define a plurality of field-level elements, wherein each of the plurality of field-level elements is associated with a respective property; and code for causing the computer to define first and second message-level elements, wherein the first message-level element is based on a first field-level element of the plurality of field-level elements, and the second message-level element is based on the first field-level element. An application programming interface (API) may be associated with a resource, of a server, having properties resolved based on at least the first and second message-level elements.

DETAILED DESCRIPTION

Figure 1:
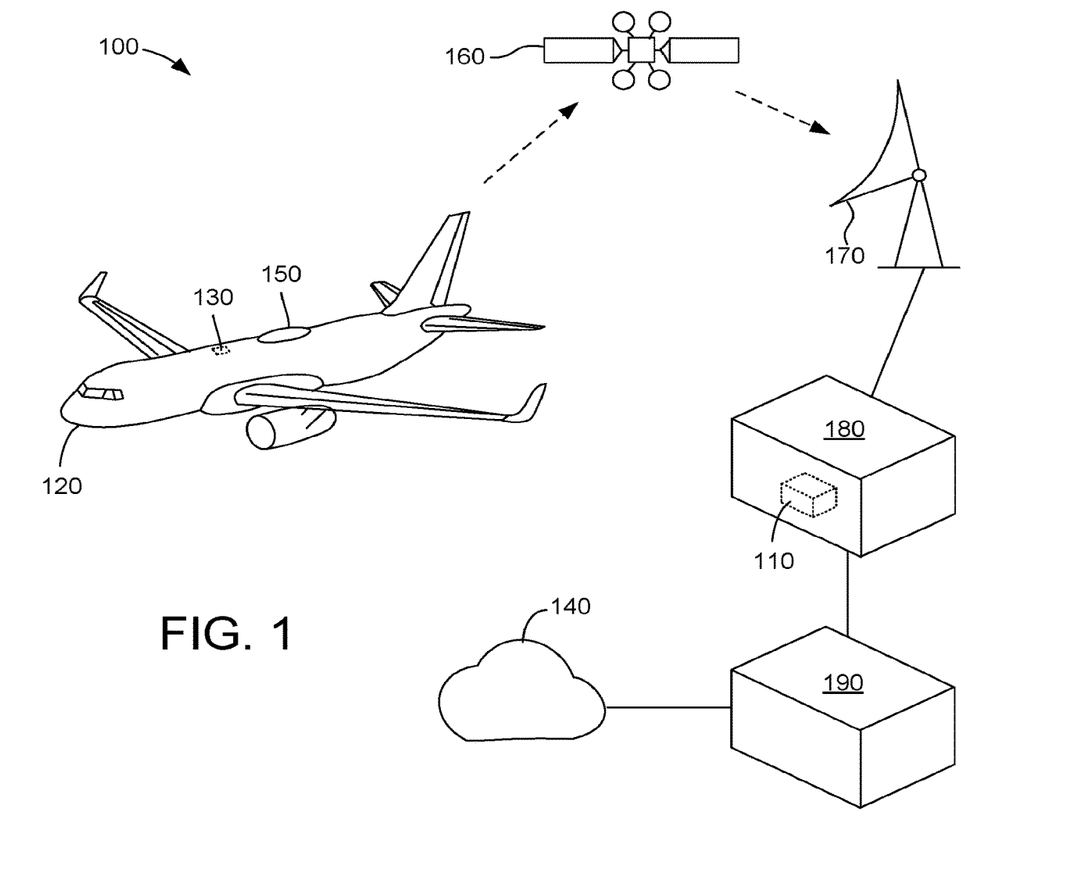
FIG. 1 is a block diagram of an example of a communication system using an application programming interface (API).

With reference to FIG. 1, a system 100 may communicate through an application programming interface (API). As an example, a ground server 110 may access information from an airplane 120 using an API. The airplane may include a server 130 that may be connected to the internet 140 through a modem (not shown), a radome and antenna 150, a satellite 160, a ground gateway antenna 170, and a core node 180. The core node may be connected to a partner data center 190 directly or through the internet, and may host the ground server. An application of running on the ground server may issue a command which requests information (resource) in a format defined by the API, and an application running on the airplane server may respond to the command. Similarly, an application of running on the airplane server may issue a command which requests information in a format of an API for the ground server, and an application running on the ground server may respond to the command. Thus, each time a part (e.g., application) of the system 100 sends information from the aircraft, a passenger, the satellite or the ground server, an API is used.

Each information event may be a message. An API message may be composed of fields and corresponding values, often organized as name-value pairs. An example API may be directed to airplane platform to ground messages. Several (e.g., 16) messages from air-to-ground may be in the API. The messages may relate to the platform, accounting, service level agreement (SLA) data, and network data. The platform messages may relate to configuration, usage, events, and health, and the accounting messages may relate to starts, stops, and interims.

Figure 2:
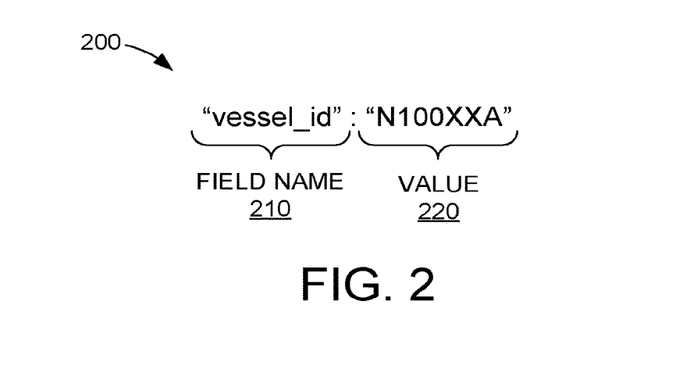
FIG. 2 is a schematic diagram of an example of a field-level element having a property comprising a name-value pair.
Figure 3:
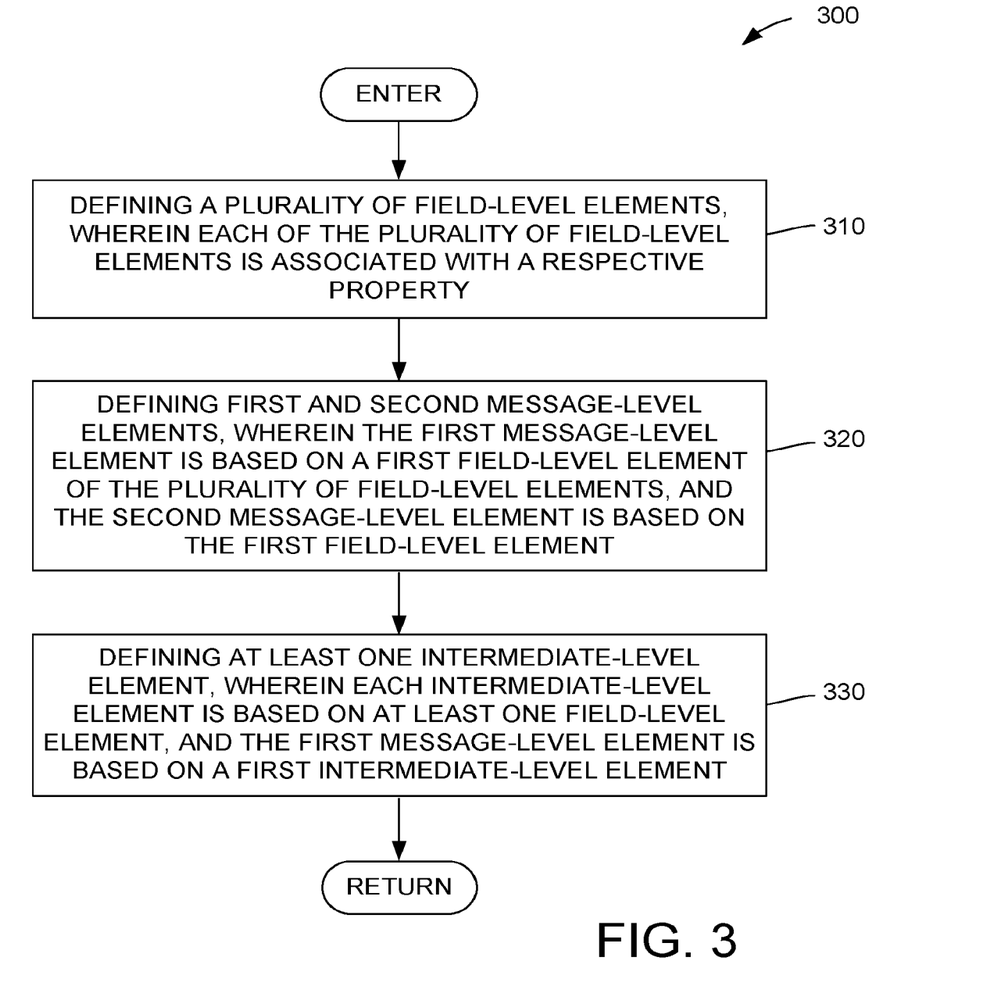
FIG. 3 is a flow diagram of an example of a method for structuring at least one resource of an API for a server.

With reference to FIG. 2, the field element 200 may include a field name 210 and a value 220. As shown, the field name is "vessel_id," and the value is "N100XXA."

With further reference to FIGS. 3-6, an aspect of the present disclosure may reside in a method 300 for structuring at least one resource of an application programming interface (API) for a server, 110 or 130. In the method, a plurality of field-level elements, 410-430, may be defined using a computer 600 (step 310). Each of the plurality of field-level elements may be associated with a respective property. Also, first and second message-level elements, 440 and 450, may be defined using the computer (step 320). The first message-level element 440 may be based on a first field-level element 410 of the plurality of field-level elements, and the second message-level element 450 may be based on the first field-level element 410. The API may be associated with a first resource having properties resolved based on at least the first and second message-level elements. The field-level elements and the definitions of the message-level elements may be stored in a data store such as a memory.

Figure 4:
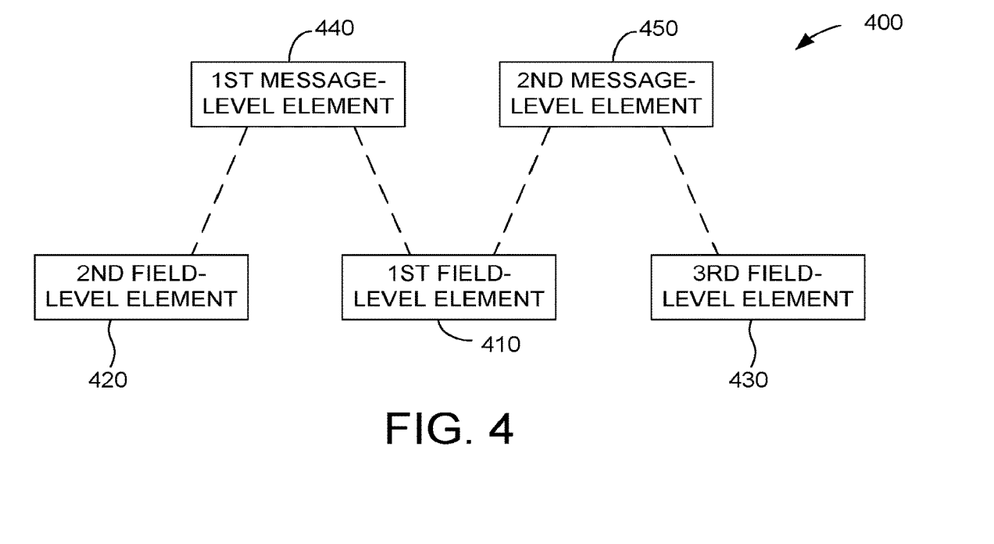
FIG. 4 is a schematic diagram of an example of a hierarchy of message-level elements and field-level elements.

Thus, a field-level element may be resolved by more than one message-level element. This allows an API message hierarchy 400 that promotes design, maintenance, and scale. An example of an API may involve 100+ REST/RMQ messages with 500+ unique fields. Without a hierarchy the inter-related model are hard to scale.

In more detailed aspects of the disclosure, the first message-level element 440 is further based on a second field-level element 420, and the second message-level element 450 is further based on a third field-level element 430. Also, at least one intermediate-level element, 460 and 470, may be defined using the computer 600 (step 330). Each intermediate-level element may be based on at least one field-level element, and the first message-level element 440 may be based on a first intermediate-level element 460. The definitions of the intermediate-level elements likewise may be stored in a data store such as a memory.

Figure 5:
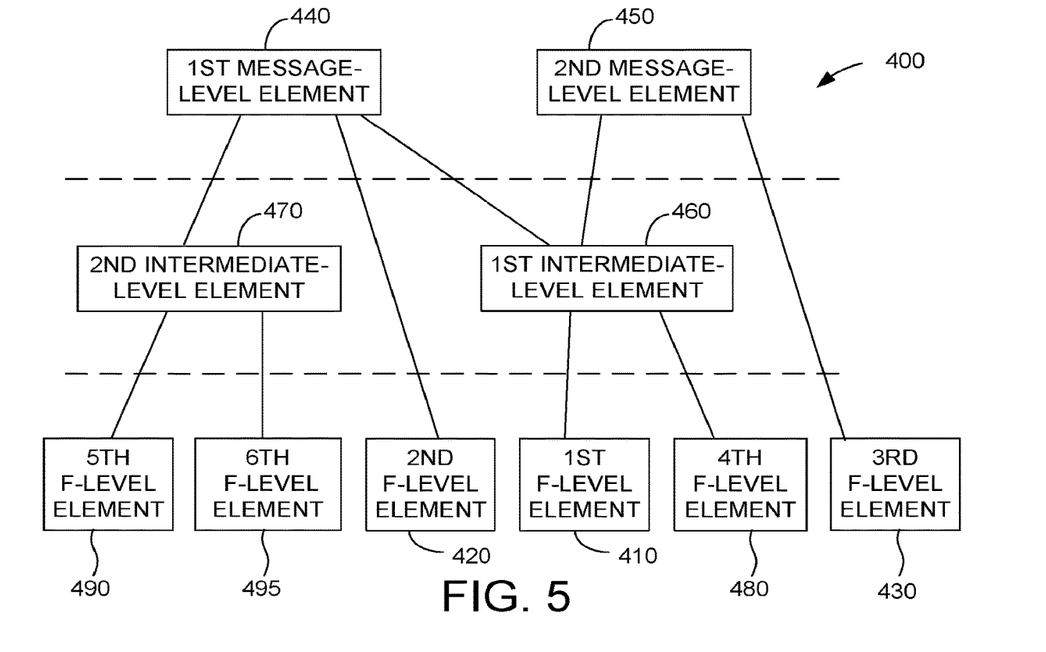
FIG. 5 is a schematic diagram of an example of an expanded hierarchy of message-level elements, intermediate-level elements, and field-level elements.

In other more detailed aspects of the disclosure, the second message-level element 450 may be based on the first intermediate-level element 460. The first intermediate-level element may be based on the first field-level element 410 and a fourth field-level element 480. Each intermediate-level element may differ from another intermediate-level element by at least one field-level element. The first message-level element 440 may be further based on a second intermediate-level element 470. The second intermediate-level element may be based on a fifth field-level element 490 and a sixth field-level element 495. The first resource may comprise an endpoint, and each property associated with a field-level element may comprise a name-value pair.

Thus, the API message hierarchy 400 may be expanded to include a message-level collection/domain, one or more intermediate-level (object-level) collections/domains, and field level collections/domains. The field-level elements may describe the basic attributes/properties as the building blocks for intermediate-level (object-level) elements and message-level elements. The intermediate-level (object-level) elements may be used to collect field-level elements (or other intermediate-level elements into new intermediate-level elements for message-level elements. The message-level elements may be used to describe the collection field-level elements and intermediate-level elements that may actually be transported. Accordingly, the API may provide resources that each may be resolved using the hierarchy of the respective message-level elements, intermediate-level elements, and field-level elements. The resource may be represented by the attributes that may be actually transported in the information transfer.

Figure 6:
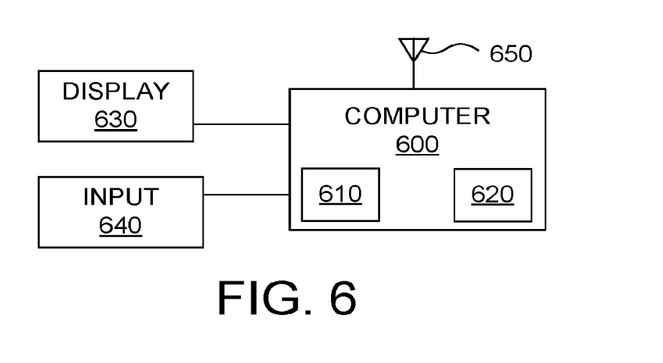
FIG. 6 is a block diagram of a computer including a processor and a memory.

With further reference to FIG. 6, the computer 600 that may include a processor 610, a storage medium 620 such as memory and/or a disk drive, a display 630, an input such as a keypad 640, and one or more wired or wireless connections 650.

Another aspect of the disclosure may reside in an apparatus (e.g., computer 600) for structuring at least one resource of a web application programming interface (API) for a server, 110 or 130, comprising: means (e.g., processor 610) for defining a plurality of field-level elements, 410-430, wherein each of the plurality of field-level elements may be associated with a respective property; and means (e.g., processor 610) for defining first and second message-level elements, 440 and 450, wherein the first message-level element 440 may be based on a first field-level element 410 of the plurality of field-level elements, and the second message-level element 450 may be based on the first field-level element 410. The API may be associated with a first resource having properties resolved based on at least the first and second message-level elements.

The apparatus may further comprise means (e.g., processor 610) for defining at least one intermediate-level element (460 and 470), wherein each intermediate-level element is based on at least one field-level element, and the first message-level element 440 is based on a first intermediate-level element 460.

Another aspect of the disclosure may reside in a non-transitory computer-readable medium (e.g., memory 620), comprising: code for causing a computer 600 to define a plurality of field-level elements, 410-430, wherein each of the plurality of field-level elements is associated with a respective property; and code for causing the computer 600 to define first and second message-level elements, 440 and 450, wherein the first message-level element 440 is based on a first field-level element 410 of the plurality of field-level elements, and the second message-level element 450 is based on the first field-level element 410. An application programming interface (API) may be associated with a resource, of a server, 110 or 130, having properties resolved based on at least the first and second message-level elements.

The OpenAPI Specification (OAS) defines a standard, programming language-agnostic interface description for REST APIs, which allows both humans and computers to discover and understand the capabilities of a service without requiring access to source code, additional documentation, or inspection of network traffic. The OAS supports referencing objects in other documents, yet it is applied in a 1:1 or 1:many structure and models are not consumed hierarchically.

The OAS was initially developed by Swagger. The SwaggerHub tool has facilities that allow object domains to be defined by field domains. By defining message domains with object domains referencing other domains, domain levels may be used. In accordance with an aspect of the disclosure, more than one message domain may reference a field domain, either directly or by way of an object domain (as an intermediary). Thus, a scalable system may be provided through reusable, hierarchical data components, such as the field-level elements.

Figure 7:
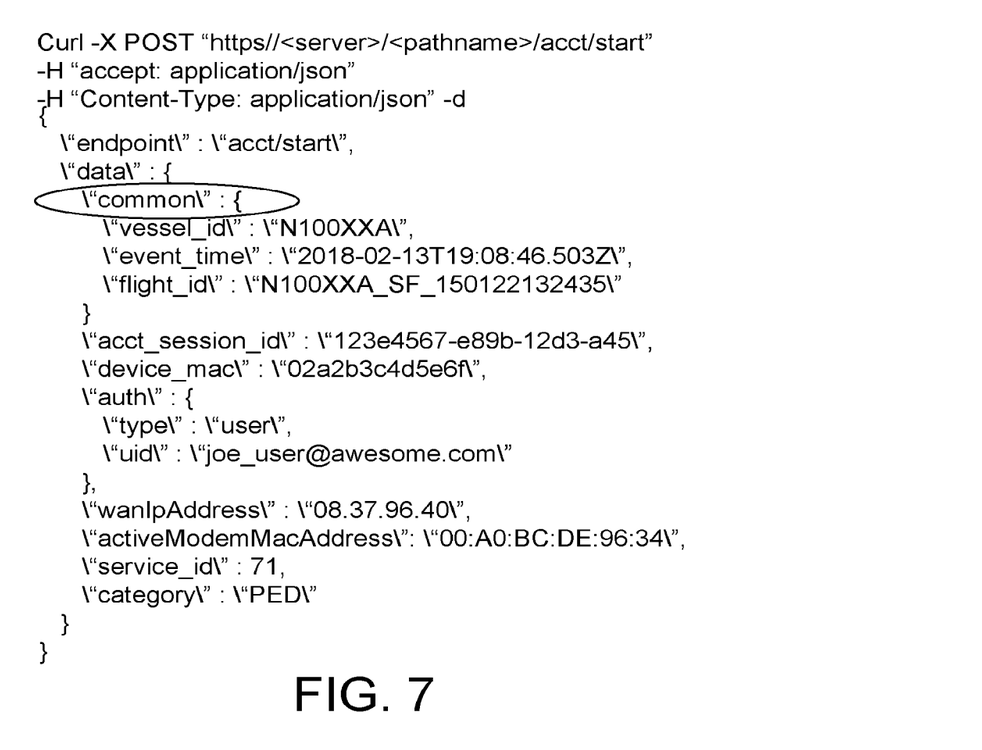
FIG. 7 is a diagram of a listing of a curl for an example of a first API resource.

With reference to FIG. 7, a curl for an API resource is shown. The API resource is associated with a POST command, and a URL is associated with an endpoint of the API. This API resource may be consumed for writing information from the airplane platform to the ground server 110.

Figure 8:
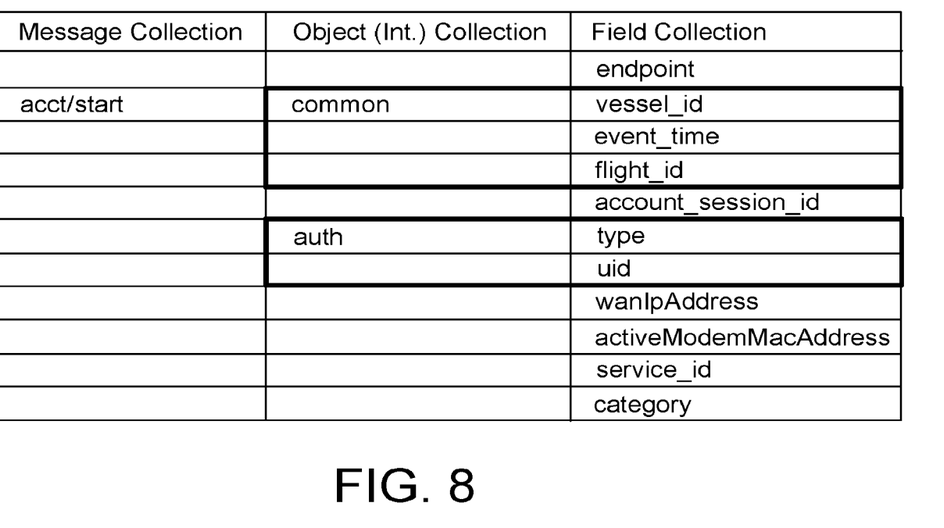
FIG. 8 is a diagram of a table showing a hierarchy of the elements associated with the listing of FIG. 7.

With further reference to FIG. 8, the API hierarchy associated with the message-level element/collection is shown. The message element is defined by two intermediate-level elements/collections: common and auth. The element name for common is shown circled in the message portion of the curl of FIG. 7.

The common element is defined by three field-level elements/collections: vessel_id, event_time, and flight_id. In the resource, each element is associated with an attribute/property. The field name-value pairs (attributes) are shown, as resolved, in the message portion of the curl of FIG. 7. For example, for the attribute associated with the vessel_id field element, the field name is vessel_id, and the value is N100XXA. The other field elements likewise have corresponding name-value pairs.

Figure 9:
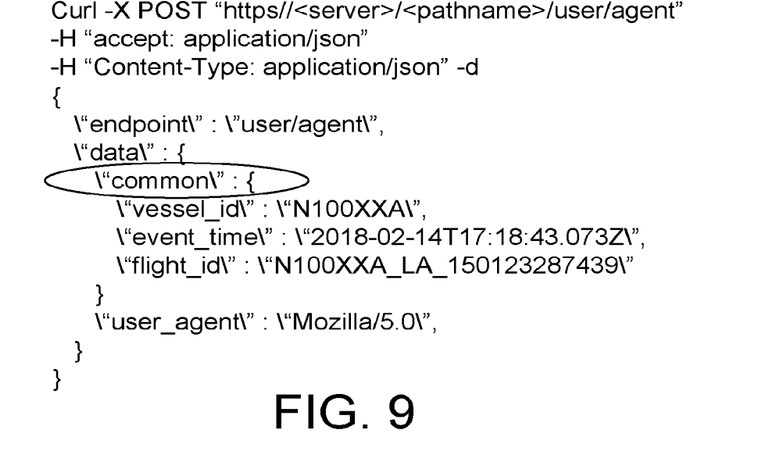
FIG. 9 is a diagram of a listing of a curl for an example of a second API resource.

With reference to FIG. 9, a curl for another API resource is shown. This API resource is likewise associated with a POST command, and the URL is associated with an endpoint of the API.

Figure 10:
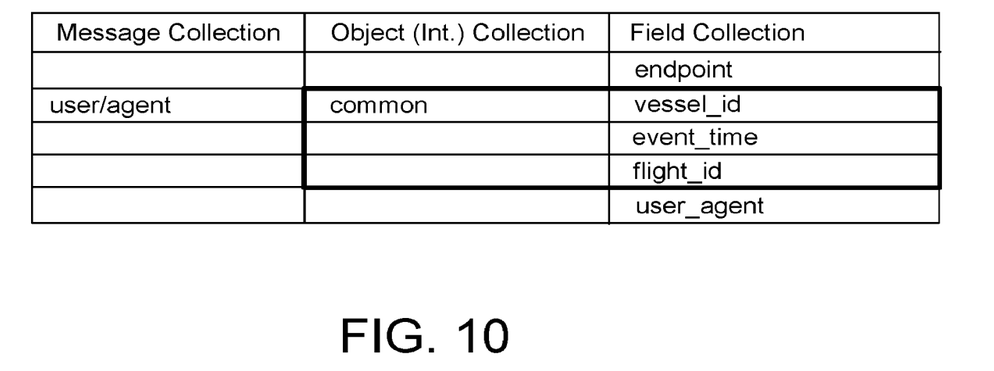
FIG. 10 is a diagram of a table showing a hierarchy of the elements associated with the listing of FIG. 9.

With further reference to FIG. 10, the API hierarchy associated with the message-level element/collection is shown. The message element is defined by an intermediate-level elements/collections: common; and by a field-level element: user_agent. Similarly, the element name for common is shown circled in the message portion of the curl of FIG. 9. In accordance with an aspect of the disclosure, both the message-level element shown in FIG. 8, and the message-element shown in FIG. 10, are defined by the common intermediate-level element shown in both FIG. 8 and FIG. 10. Thus, both of the two message level-elements are each defined by the referenced field-level elements: vessel_id, event_time, and flight_id.

Also, an intermediate-level element may be used with a legacy field attribute/property, effectively translating, for example, the legacy field name to a standardized field name. This allows efficient API management and maintenance.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary embodiments, the functions described may be implemented in hardware, software, firmware, or any combination thereof. If implemented in software as a computer program product, the functions may be stored on or transmitted over as one or more instructions or code on a computer-readable medium. The code may be executed by the processor of the computer. Computer-readable media includes both non-transitory computer-readable storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein.

What is claimed is:

1. A method for transmitting information via an application programming interface (API) at an onboard server onboard an aircraft, comprising:
    storing, at the onboard server onboard the aircraft, a hierarchy of elements comprising:
        a plurality of field-level elements including a first field-level element, a second field-level element, and a third field-level element, wherein each of the plurality of field-level elements is associated with a respective property;
        a first message-level element based on the first field-level element and the second field-level element of the plurality of field-level elements; and
        a second message-level element based on the first field-level element and the third field-level element;
    receiving a first request for aircraft information from a ground server external to the aircraft, the first request including a first resource associated with the first message-level element; and
    in response to receiving the first request, transmitting, to the ground server via the API at the onboard server, a first response including the first field-level element, the second field-level element, and the first message-level element.

2. The method of claim 1, further comprising:
    storing, at the onboard server, at least one intermediate-level element, wherein each intermediate-level element is based on at least one field-level element, and the first message-level element is based on a first intermediate-level element.

3. The method of claim 2, wherein the second message-level element is based on the first intermediate-level element.

4. The method of claim 2, wherein the first intermediate-level element is based on the first field-level element and a fourth field-level element.

5. The method of claim 2, wherein each intermediate-level element differs from another intermediate-level element by at least one field-level element.

6. The method of claim 2, wherein the first message-level element is further based on a second intermediate-level element.

7. The method of claim 6, wherein the second intermediate-level element is based on a fifth field-level element and a sixth field-level element.

8. The method of claim 1, wherein the first resource comprises an endpoint of the API.

9. The method of claim 1, wherein each property associated with a field-level element comprises a name-value pair.

10. The method of claim 1, further comprising:
    receiving a second request for aircraft information from the ground server external to the aircraft, the second request including a second resource associated with the second message-level element; and
    in response to receiving the second request, transmitting, to the ground server via the API at the onboard server, a second response including the first field-level element, the third field-level element, and the second message-level element.

11. The method of claim 1, wherein the first field-level element comprises a vehicle identifier.

12. An apparatus for transmitting information via an application programming interface (API) at an onboard server onboard an aircraft, comprising:
    means for storing, at the onboard server onboard an aircraft, a hierarchy of elements comprising:
        a plurality of field-level elements including a first field-level element, a second field-level element, and a third field-level element, wherein each of the plurality of field-level elements is associated with a respective property;
        a first message-level element based on the first field-level element and the second field-level element of the plurality of field-level elements; and
        a second message-level element based on the first field-level element and the third field-level element;
    means for receiving a first request for aircraft information from a ground server external to the aircraft, the first request including a first resource associated with the first message-level element; and
    means for transmitting, in response to receiving the first request and to the ground server via the API at the onboard server, a first response including the first field-level element, the second field-level element, and the first message-level element.

13. The apparatus of claim 12, further comprising:
    means for storing at least one intermediate-level element, wherein each intermediate-level element is based on at least one field-level element, and the first message-level element is based on a first intermediate-level element.

14. The apparatus of claim 13, wherein the second message-level element is based on the first intermediate-level element.

15. The apparatus of claim 13, wherein the first intermediate-level element is based on the first field-level element and a fourth field-level element.

16. The apparatus of claim 13, wherein each intermediate-level element differs from another intermediate-level element by at least one field-level element.

17. The apparatus of claim 13, wherein the first message-level element is further based on a second intermediate-level element.

18. The apparatus of claim 17, wherein the second intermediate-level element is based on a fifth field-level element and a sixth field-level element.

19. The apparatus of claim 12, wherein each property associated with a field-level element comprises a name-value pair.

20. An apparatus for transmitting information via an application programming interface (API) at an onboard server onboard an aircraft, comprising:
a hardware processor configured to:
store, at the onboard server onboard the aircraft, a hierarchy of elements comprising:
a plurality of field-level elements including a first field-level element, a second field-level element, and a third field-level element, wherein each of the plurality of field-level elements is associated with a respective property;
a first message-level element based on the first field-level element and the second field-level element of the plurality of field-level elements; and
a second message-level element based on the first field-level element and the third field-level element;
receive a first request for aircraft information from a ground server external to the aircraft, the first request including a first resource associated with the first message-level element; and
in response to receiving the first request, transmit, to the ground server via the API at the onboard server, a first response including the first field-level element, the second field-level element, and the first message-level element.

21. The apparatus of claim 20, wherein the hardware processor is further configured to store at least one intermediate-level element, wherein each intermediate-level element is based on at least one field-level element, and the first message-level element is based on a first intermediate-level element.

22. The apparatus of claim 21, wherein the second message-level element is based on the first intermediate-level element.

23. The apparatus of claim 21, wherein the first intermediate-level element is based on the first field-level element and a fourth field-level element.

24. The apparatus of claim 21, wherein each intermediate-level element differs from another intermediate-level element by at least one field-level element.

25. The apparatus of claim 21, wherein the first message-level element is further based on a second intermediate-level element.

26. The apparatus of claim 25, wherein the second intermediate-level element is based on a fifth field-level element and a sixth field-level element.

27. The apparatus of claim 20, wherein each property associated with a field-level element comprises a name-value pair.

28. A non-transitory computer-readable medium onboard an aircraft, comprising:
code for causing a computer onboard an aircraft to store a hierarchy of elements comprising:
a plurality of field-level elements including a first field-level element, a second field-level element, and a third field-level element, wherein each of the plurality of field-level elements is associated with a respective property;
code for causing the computer to store a first message-level element based on the first field-level element and the second field-level element of the plurality of field-level elements; and
code for causing the computer to store a second message-level element based on the first field-level element and the third field-level element;
code for causing the computer to receive a first request for aircraft information from a ground server external to the aircraft, the first request including a first resource associated with the first message-level element; and
code for causing the computer to transmit, in response to receiving the first request and to the ground server via an API at the computer, a first response including the first field-level element the second field-level element, and the first message-level element.

29. The non-transitory computer-readable medium of claim 28, further comprising code for causing the computer to store at least one intermediate-level element, wherein each intermediate-level element is based on at least one field-level element, and the first message-level element is based on a first intermediate-level element.

30. The non-transitory computer-readable medium of claim 29, wherein the second message-level element is based on the first intermediate-level element.

31. The non-transitory computer-readable medium of claim 29, wherein the first intermediate-level element is based on the first field-level element and a fourth field-level element.

32. The non-transitory computer-readable medium of claim 29, wherein each intermediate-level element differs from another intermediate-level element by at least one field-level element.

33. The non-transitory computer-readable medium of claim 29, wherein the first message-level element is further based on a second intermediate-level element.

34. The non-transitory computer-readable medium of claim 33, wherein the second intermediate-level element is based on a fifth field-level element and a sixth field-level element.

35. The non-transitory computer-readable medium of claim 28, wherein each property associated with a field-level element comprises a name-value pair.

* * * * *